US012744585B2

(12) United States Patent
Li et al.

(10) Patent No.: US 12,744,585 B2
(45) Date of Patent: Sep. 22, 2026

(54) WIRELESS COMMUNICATION SYSTEM, WIRELESS COMMUNICATION METHOD, APPARATUS, DEVICE, AND STORAGE MEDIUM

(71) Applicant: GUANGDONG OPPO MOBILE TELECOMMUNICATIONS CORP., LTD., Dongguan (CN)

(72) Inventors: Haitao Li, Dongguan (CN); Huanxi Cui, Dongguan (CN); Zhenyu Xiao, Dongguan (CN); Fei Lu, Dongguan (CN); Jingran Chen, Dongguan (CN); Xinlei Yu, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 321 days.

(21) Appl. No.: 18/397,138

(22) Filed: Dec. 27, 2023

(65) Prior Publication Data

US 2024/0137108 A1 Apr. 25, 2024

Related U.S. Application Data

(63) Continuation of application No. PCT/CN2021/105849, filed on Jul. 12, 2021.

(51) Int. Cl.
*H04B 7/185* (2006.01)
*H04W 92/04* (2009.01)

(52) U.S. Cl.
CPC ......... *H04B 7/18513* (2013.01); *H04W 92/04* (2013.01)

(58) Field of Classification Search
CPC .. H04B 7/185; H04B 7/1851; H04B 7/18513; H04B 7/18515; H04B 7/18519;
(Continued)

(56) References Cited

U.S. PATENT DOCUMENTS

2016/0066245 A1 3/2016 Vikberg et al.
2019/0373666 A1 12/2019 Khan
(Continued)

FOREIGN PATENT DOCUMENTS

CN 111918297 A 11/2020
WO 2020176535 A1 9/2020

OTHER PUBLICATIONS

ETSI, "Satellite Earth Stations and Systems (SES); Family SL Satellite Radio Interface (Release 1); Part 1: General Specifications; Sub-part 3: Satellite Radio Interface Overview", Oct. 2015, ETSI TS 102 744-1-3 V1.1.1, pp. 1-18 (Year: 2015).*
(Continued)

*Primary Examiner* — Paul H. Masur
(74) *Attorney, Agent, or Firm* — Sheppard, Mullin, Richter & Hampton LLP

(57) ABSTRACT

The present disclosure discloses a wireless communication method, a terminal, and a network side device. The wireless communication method is applied in a terminal and includes: transmitting, via a first interface with a control plane unit cluster in a wireless communication system, a control plane message with the control plane unit cluster; and transmitting, via a second interface with a user plane unit cluster in the wireless communication system, user data with the user plane unit cluster. The wireless communication system includes a radio frequency unit and a core network cluster, and the core network cluster includes the control plane unit cluster and the user plane unit cluster.

19 Claims, 7 Drawing Sheets

(58) Field of Classification Search
CPC ........ H04L 69/30; H04L 69/32; H04W 92/04; H04W 92/10; H04W 84/06
See application file for complete search history.

(56) References Cited

U.S. PATENT DOCUMENTS

| | | | | |
|---|---|---|---|---|
| 2020/0068047 | A1 | 2/2020 | Huang et al. | |
| 2020/0396000 | A1* | 12/2020 | Ryu | H04W 76/25 |
| 2021/0153095 | A1* | 5/2021 | Yang | H04L 43/04 |
| 2022/0408353 | A1* | 12/2022 | Hegde | H04W 48/18 |
| 2023/0189208 | A1* | 6/2023 | Kim | H04W 60/00 370/329 |

OTHER PUBLICATIONS

International Search Report and Written Opinion dated Mar. 28, 2022 in International Application No. PCT/CN2021/105849. English translation attached.
3GPP TSGRAN. "Study on new radio access technology: Radio access architecture and interfaces (Release 14)" 3GPP TR 38.801 V14.0.0, Mar. 31, 2017 Mar. 31, 2017)pp. 40-42,section 9.1.
3GPP Technical Specification Group Services and System Aspects. "Study on Architecture for Next Generation System (Release 14)" 3GPP TR 23.799 V14,0,0, Dec. 31, 2016 (Dec. 31, 2016) pp. 113-114.
"3rd Generation Partnership Project;Technical Specification Group Radio Access Network;Solutions for NR to support non-terrestrial networks (NTN) (Release 16)" 3GPP TR 38.821 V1.0.0,Dec. 6, 2019, sections 5.1 and 5.2.
Extended European search report of counterpart European application No. 21949583.5 issued on Jun. 27, 2024.

* cited by examiner

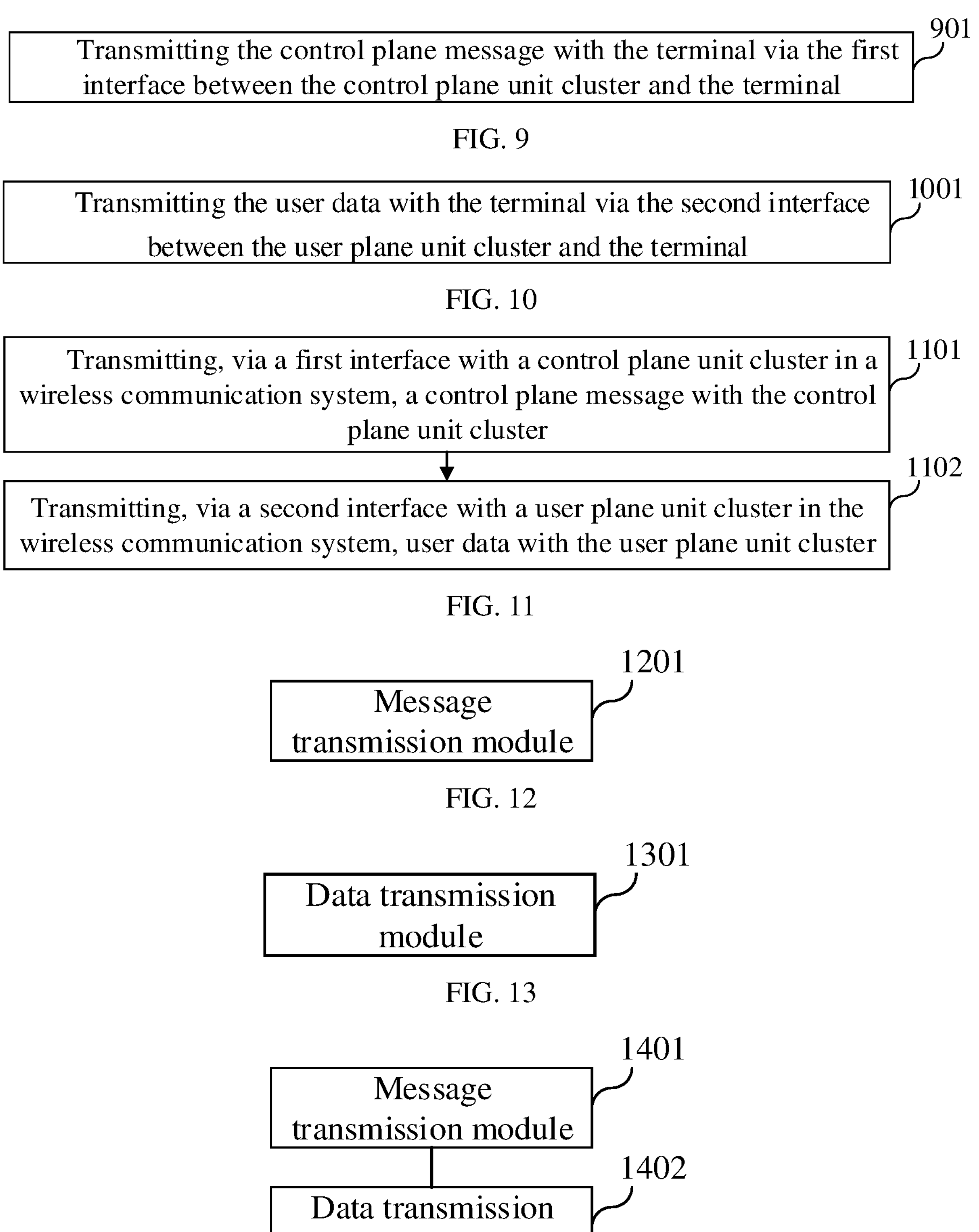
901
Transmitting the control plane message with the terminal via the first interface between the control plane unit cluster and the terminal
FIG. 9
1001
Transmitting the user data with the terminal via the second interface between the user plane unit cluster and the terminal
FIG. 10
1101
Transmitting, via a first interface with a control plane unit cluster in a wireless communication system, a control plane message with the control plane unit cluster
1102
Transmitting, via a second interface with a user plane unit cluster in the wireless communication system, user data with the user plane unit cluster
FIG. 11
1201
Message transmission module
FIG. 12
1301
Data transmission module
FIG. 13
1401
Message transmission module
1402
Data transmission module
FIG. 14

WIRELESS COMMUNICATION SYSTEM, WIRELESS COMMUNICATION METHOD, APPARATUS, DEVICE, AND STORAGE MEDIUM

CROSS-REFERENCE TO RELATED APPLICATIONS

This application is a continuation of International Application No. PCT/CN2021/105849 filed on Jul. 12, 2021, and entitled "WIRELESS COMMUNICATION SYSTEM, WIRELESS COMMUNICATION METHOD, APPARATUS, DEVICE, AND STORAGE MEDIUM", the entire contents of which are incorporated herein by reference.

FIELD

The present disclosure relates to the field of wireless communication technologies, and more particularly, to a wireless communication system, a wireless communication method, an apparatus, a device, and a storage medium.

BACKGROUND

In a 5-th Generation Mobile Communication Network (5G) system, to improve system coverage, the industry proposes a Non-Terrestrial Network (NTN) as a supplement to a terrestrial network.

In the related art, the NTN has two architectures: a transparent forwarding architecture and a regenerative architecture. In the transparent forwarding architecture, a satellite acts as a relay node between a terminal and a terrestrial base station, and the base station and functions of a core network are all located on the ground. In the regenerative architecture, the satellite carries a complete base station or a Distributed Unit (DU), while functions of the core network are all located on the ground.

However, at present, signaling interactions between the terminal and the network are complex, leading to problems of a high transmission delay and network instability in NTN networks with fast topology changes.

SUMMARY

Embodiments of the present disclosure provide a wireless communication system, a wireless communication method, an apparatus, a device, and a storage medium. Technical solutions are as follows.

In a first aspect, the embodiments of the present disclosure provide a wireless communication method applied in a terminal. The method includes: transmitting, via a first interface with a control plane unit cluster in a wireless communication system, a control plane message with the control plane unit cluster; and transmitting, via a second interface with a user plane unit cluster in the wireless communication system, user data with the user plane unit cluster. The wireless communication system includes a radio frequency unit and a core network cluster, and the core network cluster includes the control plane unit cluster and the user plane unit cluster.

In a second aspect, the embodiments of the present disclosure provide a terminal. The terminal includes a processor and a memory having at least one program code stored thereon. The at least one program code is loaded and executed by the processor to implement a wireless communication method. The method includes: transmitting, via a first interface with a control plane unit cluster in a wireless communication system, a control plane message with the control plane unit cluster; and transmitting, via a second interface with a user plane unit cluster in the wireless communication system, user data with the user plane unit cluster. The wireless communication system includes a radio frequency unit and a core network cluster, and the core network cluster includes the control plane unit cluster and the user plane unit cluster.

In a third aspect, the embodiments of the present disclosure provide a network side device in a wireless communication system. The network side device includes a processor and a memory having at least one program code stored thereon. The at least one program code is loaded and executed by the processor to implement a wireless communication method. The method includes: transmitting, via a first interface between a control plane unit cluster and a terminal, a control plane message with the terminal; and transmitting, via a second interface between a user plane unit cluster and the terminal, user data with the terminal. The wireless communication system includes a radio frequency unit and a core network cluster, and the core network cluster includes the control plane unit cluster and the user plane unit cluster.

BRIEF DESCRIPTION OF THE DRAWINGS

In order to clearly explain technical solutions of the embodiments of the present disclosure, drawings used in the description of the embodiments are briefly described below. Obviously, the drawings as described below are merely some embodiments of the present disclosure. Based on these drawings, other drawings can be obtained by those skilled in the art without creative effort.

FIG. 9 is a flowchart illustrating a wireless communication method according to an embodiment of the present disclosure.

FIG. 10 is a flowchart illustrating a wireless communication method according to an embodiment of the present disclosure.

FIG. 11 is a flowchart illustrating a wireless communication method according to an embodiment of the present disclosure.

FIG. 12 is a block diagram showing a wireless communication apparatus according to an embodiment of the present disclosure.

FIG. 13 is a block diagram showing a wireless communication apparatus according to an embodiment of the present disclosure.

FIG. 14 is a block diagram showing a wireless communication apparatus according to an embodiment of the present disclosure.

DETAILED DESCRIPTION

In order to make the objects, technical solutions, and advantages of the present disclosure more apparent, the embodiments of the present disclosure will be described in detail below with reference to the accompanying drawings.

The network architecture and service scenarios described in the embodiments of the present disclosure are intended to illustrate the technical solutions of the embodiments of the present disclosure more clearly and do not constitute a limitation of the technical solutions provided in the embodiments of the present disclosure. It is conceivable for those skilled in the art that the technical solutions provided in the embodiments of the present disclosure are equally applicable to similar technical problems as the network architecture evolves and new service scenarios emerge.

Figure 1:
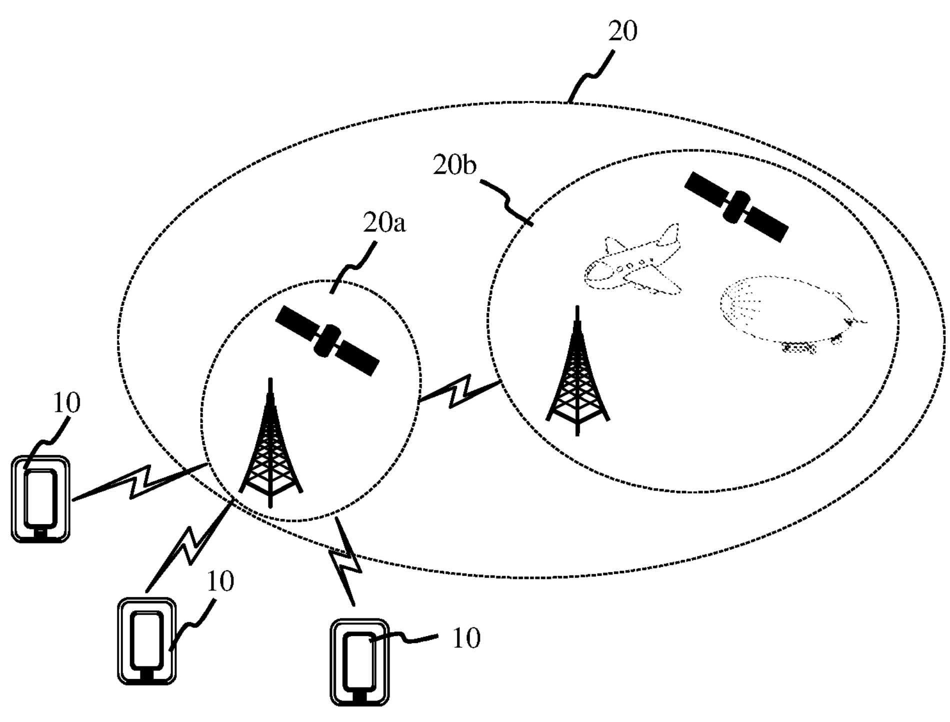
FIG. 1 is a schematic diagram showing a network architecture of a communication system according to an embodiment of the present disclosure.

FIG. 1 illustrates a schematic diagram showing a network architecture of a communication system according to an embodiment of the present disclosure. As illustrated in FIG. 1, the network architecture may include a terminal 10 and a wireless communication system 20.

Usually a plurality of terminals 10 is provided. The terminals 10 can include various handheld apparatuses having a wireless communication function, a vehicle-mounted apparatus, a wearable apparatus, a computing apparatus or another processing apparatus connected to a wireless modem, various forms of User Equipment (UE), a Mobile Station (MS), a terminal device, etc. For ease of description, the above-mentioned apparatuses are collectively referred to as the terminal in the embodiments of the present disclosure.

The wireless communication system 20 includes a radio frequency unit 20*a* and a core network cluster 20*b*.

Each radio frequency unit 20*a* can be configured to provide communication services for one or more terminals 10.

The core network cluster 20*b* is configured to implement all or part of the functions of a core network in a 5G NR system.

In an embodiment of the present disclosure, the core network cluster 20*b* can further be configured to implement all or part of the functions of an access network in the 5G NR system.

The core network cluster 20*b* may include a plurality of function units. The plurality of function units is configured to implement different functions in the core network and/or the access network, respectively.

In the embodiments of the present disclosure, each of the radio frequency unit 20*a* and the core network cluster 20*b* may be provided in a terrestrial network or a non-terrestrial network.

For example, the radio frequency unit 20*a* may be provided in a terrestrial base station, or in an intra-atmospheric flight platform such as an unmanned aircraft or a manned aircraft, or in a satellite platform.

All or part of the function units in the above-mentioned core network cluster 20*b* may be provided in a base station, or in an intra-atmospheric flight platform such as an unmanned aircraft, a manned aircraft, and an airship, or in a satellite platform.

The "5G NR system" in the embodiments of the present disclosure may also be referred to as a 5G system or an NR system, but those skilled in the art may understand the meaning thereof. The technical solutions described in the embodiments of the present disclosure may be applicable to the 5G NR system and a future evolved system of the 5G NR system, such as a space-air-ground integrated network architecture of the 6-th Generation Mobile Communication Network (6G).

Before introducing schemes described in various following embodiments of the present disclosure, several terminological concepts involved in the present disclosure are first introduced.

1) 5G NR System

The 5G NR system is a new generation of wireless communication system proposed based on users' requirements for rate, latency, high-speed mobility, and energy efficiency of wireless communication and needs for diversity and complexity of wireless communication services in the future life. Main application scenarios of the 5G system are Enhanced Mobile Broadband (eMBB), Ultra-reliable and Low Latency Communications (URLLC), and Massive Machine Type Communication (mMTC).

Figure 2:
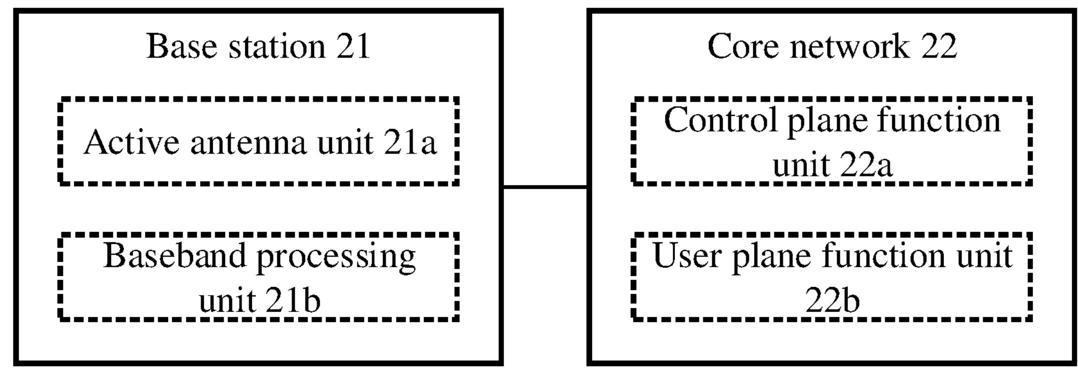
FIG. 2 is a system architecture diagram of a 5G system.

In the 5G network environment, a network side is divided into a Radio Access Network (RAN) and a Core Network (CN). FIG. 2 illustrates a system architecture diagram of a 5G system. As illustrated in FIG. 2, in the 5G system, an access network part mainly includes a base station 21. The base station 21 in the 5G NR system can be divided into two parts, namely, an Active Antenna Unit (AAU) 21*a* and a Building Base Band Unite (BBU, or a baseband processing unit) 21*b*. The AAU can provide functions of an antenna and some functions of a physical layer, while the BBU can be divided into a DU and a CU. The DU is responsible for functions of a Physical layer (PHY), an MAC layer, and an RLC layer, which are of high real-time requirements. The CU is responsible for a PDCP layer and an RRC layer, which are of low real-time requirements.

As illustrated in FIG. 2, in the 5G system, the core network 22 includes a control plane function unit 22*a* and a user plane function unit 22*b*. The control plane function unit 22*a* may include an Access and Mobility Function (AMF), an Authentication Server Function (AUSF) unit, a Radio Access Network Intelligent Controller (RIC), a Session Management Function (SMF) unit, a Network Exposure Function (NEF) unit, a Network Repository Function (NRF) unit, a Policy Control Function (PCF) unit, a Unified Data Management (UDM) unit, an Application Function (AF) unit, and so on. The user plane function unit 22*b* may include a User Plane Function (UPF) unit.

2) NTN (Non-Terrestrial Communication Network)

Currently, the relevant standard organization is studying an NTN technology that generally provides communication services to terrestrial users by means of satellite communication. Compared with terrestrial cellular network communication, satellite communication has many unique advantages. Firstly, satellite communication is not limited by geographical regions of users. For example, typical terrestrial communication cannot cover regions such as oceans, mountains, and deserts where a communication device cannot be set up or where communication coverage is not provided due to sparse population. However, for satellite communication, since a satellite can cover an extensive area of ground and orbit the earth, theoretically every corner of the earth can be covered by satellite communication. Secondly, satellite communication has a great social value. Satellite communication can cover remote mountainous regions and poor and backward countries or regions at low costs, such that people in these regions can have access to advanced voice communication and mobile Internet technologies, which is conducive to narrowing the digital divide between these regions and developed regions and promoting development in these regions. Thirdly, satellite communication has a long communication distance, and the cost of communication does not increase significantly when the communication distance increases. Finally, satellite communication has high stability and is not limited by natural disasters.

Communication satellites are classified, based on orbital altitudes, into Low-Earth Orbit (LEO) satellites, Medium-Earth Orbit (MEO) satellites, Geostationary Earth Orbit (GEO) satellites, High Elliptical Orbit (HEO) satellites, etc. The main NTN technology studied at this stage is the communication technology based on LEO satellites and GEO satellites.

LEO Satellite

An altitude of an LEO satellite ranges from 500 km to 1,500 km, and a corresponding orbital period is about 1.5 hours to 2 hours. A signal propagation delay of single-hop communication between users is generally smaller than 20 ms. A maximum visibility time period for the satellite is 20 minutes. A signal propagation distance is short. A link loss is small. A transmission power requirement for a user terminal is not high.

GEO Satellite

The GEO satellite has an orbital altitude of 35,786 km and revolves around the Earth with a period of 24 hours. A signal propagation delay of single-hop communication between users is generally 250 ms.

To ensure satellite coverage and to enhance a system capacity of the entire satellite communication system, the satellite uses multiple beams to cover the ground. One satellite can form dozens or even hundreds of beams to cover the ground. One satellite beam can cover a ground area with a diameter of tens to hundreds of kilometers.

In the embodiments of the present disclosure, the NTN network involves not only the LEO and the GEO, but also other high altitude platforms, such as an unmanned aircraft, a manned aircraft, or the like. The above-mentioned high altitude platforms can cover an altitude ranging from 8 kilometers to 35,786 kilometers.

In the related art, the architecture of the 5G NR network is divided into the access network and the core network, which are provided with functions of a control plane and functions of a user plane, respectively. The low-earth orbit satellite covers a region for a short period of time, while the medium-earth orbit satellite and the high-earth orbit satellite each covers a region for a long period of time. Since the satellite moves at a high speed, the topology of a satellite network changes fast. The topology of a large-scale LEO constellation network has complex spatio-temporal variability characteristics. Therefore, if the 5G NR network architecture is used to support the NTN, at least the following disadvantages exist.

1) If the base station and the core network are set up on the ground, a control signaling processing and data forwarding of the user has high latency.

2) If a user plane function unit is located on a satellite, an interface between the user plane function unit and the base station and an interface between the user plane function unit and a core network control plane, i.e., an N3 interface (an interface between the access network and the UPF) and an N4 interface (an interface between the SMF and the UPF), will change.

3) If the base station is on the ground and some core network functions such as the UPF and some control plane (AMF and SMF) functions are on a satellite, N1 (a signaling plane interface between the UE and the AMF), N2 (a signaling plane interface between the RAN and the AMF), N3, N6 (an interface between the UPF and a data network), Namf (an AMF function interface based on a service interface), and Nsmf (an SMF function interface based on a service interface) will change with the topology.

4) If all base stations are on the ground and all core network functions are on a satellite, instability in N1, N2, and N3 interfaces will arise.

5) If all core networks and all base stations are located on a satellite, satellite overheads will be increased. In addition, since current 5G base stations and a core network user plane are mainly oriented towards the user's proprietary device, it is impossible to flexibly slice the access network and the core network on a satellite when it comes to vertical industries such as the Industrial Internet of Things (IIoT).

In addition, the satellite has limited computation, storage, and energy. In a space-air-ground integrated network, payload resources, processing capability, data packet processing, and bandwidth resources of the satellite are limited. Since the satellite operates in space, it is limited in size, resulting in limited payload resources. For a satellite network, network-related resources are very limited. Therefore, resources are key constraints in a satellite design system. Accordingly, the industry needs to define functions of lightweight, stability, and ease to maintain that are essential for the satellite network. Currently, overall functions of the core network and the access network of the 5G network architecture are unsuitable for deployment on satellites, for a reason that it is uneasy to maintain the proprietary device for the access network and the core network user plane.

To overcome defects of a direct application of the NTN in the current 5G NR system, the embodiments of the present disclosure provide a new wireless communication system architecture that can be realized as a space-air integrated wireless communication architecture.

Figure 3:
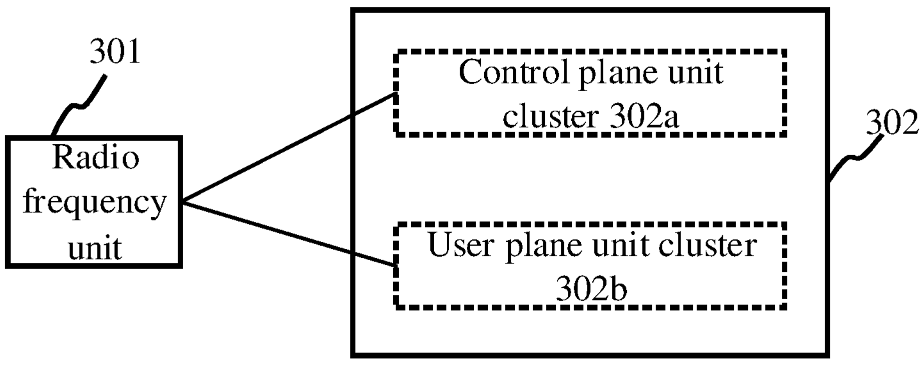
FIG. 3 is a system architecture diagram of a wireless communication system according to an embodiment of the present disclosure.

Reference can be made to FIG. 3, which illustrates a system architecture diagram of a wireless communication system according to an embodiment of the present disclosure. As illustrated in FIG. 3, the wireless communication system may include a radio frequency unit 301 and a core network cluster 302. The core network cluster includes a control plane unit cluster 302*a* and a user plane unit cluster 302*b*.

The radio frequency unit 301 is configured to perform wireless signal forwarding between the core network cluster 302 and a terminal.

A first interface is provided between the control plane unit cluster 302*a* and the terminal and is configured to transmit a control plane message between the terminal and the control plane unit cluster 302*a*.

In a possible implementation, the control plane message includes at least one of an NAS message, RRC signaling, access and mobility management signaling, or radio bearer control signaling.

A second interface is provided between the user plane unit cluster 302*b* and the terminal and is configured to transmit user data between the terminal and the user plane unit cluster 302*b*.

In summary, with the solution illustrated in the embodiment of the present disclosure, functions of a control plane and a user plane in an access network and a core network are further aggregated to form the control plane unit cluster and the user plane unit cluster. The wireless signal forwarding is performed between the terminal and a network-side unit cluster by the radio frequency unit. Each of the control plane unit cluster and the user plane unit cluster is connected to the terminal via an interface. Therefore, interfaces between the terminal and the user plane and between the terminal and the control plane are redefined, network customization is achieved, a signaling interaction process is simplified, a transmission delay is reduced, and network stability is improved.

Figure 4:
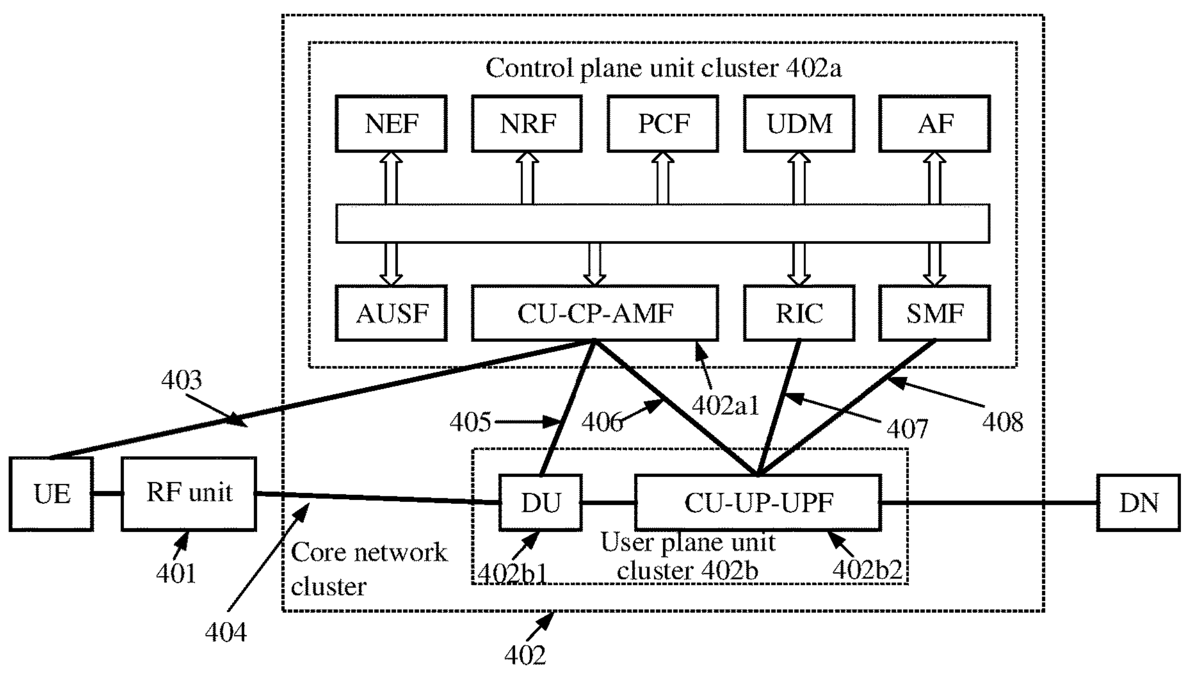
FIG. 4 is a system architecture diagram of a wireless communication system according to an embodiment of the present disclosure.

Reference can be made to FIG. 4, which illustrates a system architecture diagram of a wireless communication system according to an embodiment of the present disclosure. As illustrated in FIG. 4, the wireless communication system may include a radio frequency unit 401 and a core network cluster 402. The core network cluster includes a control plane unit cluster 402*a* and a user plane unit cluster 402*b*.

The radio frequency unit 401 is configured to perform wireless signal forwarding between the core network cluster 402 and a terminal.

A first interface 403 is provided between the control plane unit cluster 402*a* and the terminal and is configured to transmit a control plane message between the terminal and the control plane unit cluster 402*a*.

In the embodiment of the present disclosure, the first interface 403 may be referred to as an NR1 interface.

A second interface 404 is provided between the user plane unit cluster 402*b* and the terminal and is configured to transmit user data between the terminal and the user plane unit cluster 402*b*.

The wireless communication system according to the above embodiment of the present disclosure includes one unit (i.e., the radio frequency unit) and two planes (i.e., the above-mentioned control plane unit cluster and user plane unit cluster), which separate the control plane and the user plane from a hardware level. In addition, the control plane message and a user plane message between the terminal and the core network are transmitted via different interfaces.

In the embodiment of the present disclosure, the above-mentioned radio frequency unit 401 has a basic wireless signal forwarding function. For example, the radio frequency unit 401 has a Radio Frequency (RF) function, an Analog to Digital (AD) conversion function, and a Digital to Analog (DA) conversion function.

For example, in the embodiment of the present disclosure, the above-mentioned control plane unit cluster 402*a* may have functions relevant to the control plane that are involved in the access network and the core network in the 5G NR system.

For example, in the embodiment of the present disclosure, the above-mentioned user plane unit cluster 402*b* may have functions relevant to the user plane that are involved in the access network and the core network in the 5G NR system.

In the solution illustrated in FIG. 4, the control plane unit cluster 402*a* and the user plane unit cluster 402*b* each have an interface with the terminal.

The interface between the above-mentioned control plane unit cluster 402*a* and the terminal is configured to transmit a message/signaling relevant to the control plane, such as an NAS message, radio resource control signaling, access and mobility management signaling, and radio bearer control signaling. The interface between the above-mentioned user plane unit cluster 402*b* and the terminal is configured to transmit user plane data, such as the PDU and the SDU.

In a possible implementation, a user-side protocol stack corresponding to the first interface includes a Non Access Stratum Session Management (NAS-SM) protocol, an NAS Mobility Management (NAS-MM) protocol, a Radio Resource Control (RRC) protocol, a Packet Data Convergence Protocol (PDCP), and a New Radio Physical layer (NR-PHY) protocol; and a network-side protocol stack corresponding to the first interface includes an NAS-SM protocol, an NAS-MM protocol, an RRC protocol, a PDCP Control Plane (PDCP-CP), and a Satellite Radio Interface (SRI) protocol.

In the embodiment of the present disclosure, since the control plane unit cluster 402*a* is responsible for the functions relevant to the control plane, the protocol stack of the first interface between the control plane unit cluster 402*a* and the terminal also mainly involves protocols relevant to the control plane. For example, the PDCP in the protocol stack of the first interface is a PDCP-CP relevant to the control plane. Further, to facilitate space-air integrated deployment, the protocol stack of the above-mentioned first interface further supports an SRI protocol configured for transparent transmission of signals.

In a possible implementation, a user-side protocol stack corresponding to the second interface includes a PDU protocol, an SDAP, a PDCP, an RLC protocol, an MAC protocol, and an NR-PHY protocol; and a network-side protocol stack corresponding to the second interface includes a PDU protocol, an SDAP, a PDCP-UP, an RLC protocol, an MAC protocol, a PHY protocol, and an SRI protocol.

In the embodiment of the present disclosure, since the user plane unit cluster 402*b* is responsible for the functions relevant to the user plane, the protocol stack of the second interface between the user plane unit cluster 402*b* and the terminal also mainly involves protocols relevant to the user plane. For example, the PDCP in the protocol stack of the second interface is a PDCP-UP relevant to the user plane. Further, to facilitate the space-air integrated deployment, the protocol stack of the above-mentioned second interface further supports an SRI protocol configured for transparent transmission of signals.

In a possible implementation, some of the functions in the AAU and the BBU of the access network in the 5G NR system may be virtualized, while AD/DA/RF functions may be retained and serve as the above-mentioned radio frequency unit. The functions virtualized from the AAU and the BBU are combined with the DU to form a new DU unit (the unit involved in the embodiments of the present disclosure can also be referred to as a network unit or a unit). A control plane and a data plane of the CU unit in the 5G NR system are separated into a Centralized Unit Control Plane (CU-CP) and a Centralized Unit User Plane (CU-UP). The CU-CP and the AMF of the core network are functionally reorganized (referred to as the CU-CP-AMF in the present disclosure). The CU-UP and the UPF of the core network are functionally reorganized (referred to as the CU-UP-UPF in the present disclosure). The core network is merged with the access network. The CU-CP-AMF and another control plane function unit (e.g., the core network control plane in the 5G NR system) form a new network control plane. The CU-UP-UPF and the DU form a new network data plane.

In a possible implementation, the control plane unit cluster 402*a* includes a centralized control plane fusion unit 402*a*1.

The first interface 403 includes an interface between the terminal and the centralized control plane fusion unit.

The centralized control plane fusion unit includes an RRC function, a PDCP-CP function, and an access and mobility management function.

In the embodiment of the present disclosure, a control plane and a data plane in the CU unit of the RAN in the 5G NR system may be separated into the CU-CP and the CU-UP. A function composition of the original CU is composed of the RRC, the PDCP, and the SDAP. In the embodiment of the present disclosure, after the control plane and the data plane of the CU are separated into the CU-CP and the CU-UP, a function composition of the CU-CP is composed of the RRC and the PDCP-CP, and main functions performed by which include wireless resource control, mobility management, unlimited bearer control of the PDU, etc., and a function composition of the CU-UP is composed of the PDCP-UP and the SDAP, and main functions performed by which include routing of a QoS flow, a header compression of the DU, reorganization numbering, etc.

The above-mentioned CU-CP is functionally merged with the core network control plane unit AMF. For example, functions relevant to mobility management and access control in the CU-CP are merged with the AMF unit to form a new function unit, i.e., the CU-CP-AMF.

In deployment of a terrestrial network, since resources are relatively unconstrained, the CU-CP-AMF unit may be deployed on a common platform (e.g., X86, etc.) using the Network Function Virtualization (NFV) technology. However, it is difficult to for the satellite network and a space-based platform to carry the common platform such as X86 because of limited resources of the satellite network and the space-based platform. In this solution, in the non-terrestrial network, a lightweight CU-CP-AMF unit may be built on a programmable platform. The above programmable platform may be a programmable Field Programmable Gate Array (FPGA), a chipset accelerator, or the like.

In a possible implementation, a control message transmitted by the first interface includes at least one of an NAS message, signaling for access management, signaling for mobility management, signaling for network radio resource management, or radio bearer control signaling for a user packet data unit.

In the embodiment of the present disclosure, the first interface may be applied between the terminal and a network side to transmit messages relevant to the control plane such as an NAS message, radio resource control signaling, access and mobility management signaling, and radio bearer control signaling.

In a possible implementation, communication between the centralized control plane fusion unit and another unit in the control plane unit cluster is performed via a service-based interface. For example, the service-based interface may be based on at least one of a Hyper Text Transfer Protocol (HTTP) logic interface or a Segment Routing Internet Protocol Version 6 (SRv6) interface.

In a possible implementation, the other unit in the control plane unit cluster includes at least one of an AUSF unit, an RIC, an SMF unit, an NEF unit, an NRF unit, a PCF unit, a UDM unit, or an AF unit.

In FIG. 4, only as an example for description, the control plane unit cluster includes the CU-CP-AMF, the AUSF, the RIC, the SMF, the NEF, the NRF, the PCF, the UDM, and the AF. The above-mentioned control plane unit cluster may further include other function units relevant to the control plane. A quantity and types of the network unit included in the control plane unit cluster are not limited in the embodiments of the present disclosure.

In the architecture involved in the embodiment of the present disclosure, the CU-CP-AMF unit may be a unit deployed based on the microservice technology. Therefore, an interface between the CU-CP-AMF unit and another unit in the control plane may be a service-based interface, such as a HTTP/HTTP2.0-based interface. In the CU of the 5G NR system, there are two main interfaces between the CU and the core network, i.e., an interface N2 with the AMF and an interface N3 with the UPF. In the architecture disclosed in the embodiment of the present disclosure, the N2 interface used for returning control signaling is removed, and control plane messages, such as NAS-type messages of the user, no longer needs to be transmitted transparently via the N2 interface. Therefore, the first interface NR1 between the CU-CP-AMF unit and UE of the mobile user is defined by the architecture involved in the embodiment of the present disclosure. The control plane messages such as the NAS message or the radio bearer control signaling are directly transmitted and carried via the new interface NR1. Also, in the embodiment of the present disclosure, the N3 interface for the CU-UP and the UPF is removed. The CU-CP-AMF unit and other units are based on the microservice technology. Therefore, an interface 405 between the CU-CP-AMF and the CU-UP-UPF may be a service-based interface. The service-based interface includes at least one of an HTTP protocol interface (e.g., an HTTP/HTTP2.0 protocol interface) or an SRv6 interface.

In addition, other interfaces between the control plane unit cluster 402*a* and the user plane unit cluster 402*b*, such as an interface 406 between the CU-CP-AMF and the DU in FIG. 4, an interface 407 between the RIC and the CU-UP-UPF in FIG. 4, and an interface 408 between the SMF and the CU-UP-UPF in FIG. 4, may be service-based interfaces.

In a possible implementation, service-based interfaces between the individual network units may be unified service-based interfaces, or interfaces between the above-mentioned individual network units may be different service-based interfaces.

In a possible implementation, the interfaces between the above-mentioned individual network units may also adopt the interfaces in the 5G NR system.

To support interactions between the user and the control plane in a space-air-ground integrated network, compatibility with original inter-satellite interfaces is necessary in high altitude platform scenarios such as satellites. Therefore, the protocol stack of the NR1 interface includes an inter-satellite interface protocol stack.

Figure 5:
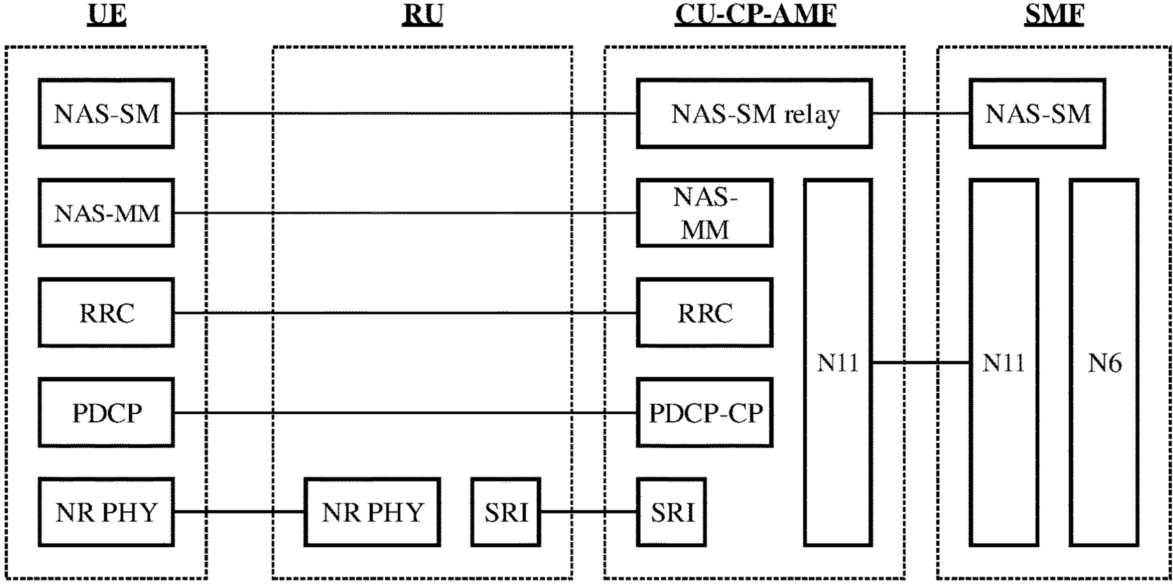
FIG. 5 is a schematic diagram showing a user-to-control-plane protocol stack involved in the embodiment illustrated in FIG. 4.

Reference can be made to FIG. 5, which illustrates a schematic diagram of a user-to-control-plane protocol stack, involved in the embodiment of the present disclosure, for use in a space-air-ground integrated network. As illustrated in FIG. 5, a new interface between the user and the control plane is defined according to the embodiment of the present disclosure. A user-side control plane protocol stack is composed of the NAS-SM, the NAS-MM, the RRC, the PDCP, and the NR-PHY. A CU-CP-AMF protocol stack mainly includes the NAS-SM, the NAS-MM, the RRC, the PDCP-C, and the SRI protocol. The interface NR1 is capable of directly carrying the NAS-type messages such as a random access message (msg), an SM message, a Short Message Service (SMS) message, a terminal policy (e.g., UE policy) message, and a Location Service (LCS). In the system architecture involved in the embodiment of the present disclosure, a unified access technology is adopted by the user. Data of the NR1 interface is transmitted transparently via an SRI interface when transmitted from a Radio Unit (RU) to the CU-CP-AMF.

As illustrated in FIG. 5, in the embodiment of the present disclosure, functions, corresponding to the first interface, corresponding to the NAS-MM, the RRC, the PDCP-CP, and the SRI protocol between the network sides may be deployed in the CU-CP-AMF unit, and an NAS-SM function may be deployed in the SMF unit. The CU-CP-AMF unit is configured to provide an NAS-SM relay function for delivering, to the SMF unit, messages/data required for the NAS-SM function. The CU-CP-AMF unit and the SMF unit can be configured to communicate with each other via an N11 interface or via a service-based interface (e.g., a service-based SMF interface, i.e., the Nsmf interface). The SMF unit may also be connected to the data network (DN) via an N6 interface.

In the embodiment of the present disclosure, main functions of the NR1 interface include but are not limited to the following functions.

1) Transmission of access and mobility management signaling: which is responsible for access management of the user; and responsible for intra-base switching, inter-base-station switching, and inter-network switching of the user. The mobility management signaling terminates at the CU-CP-AMF.

2) Transmission of the signaling for the network radio resource management.

3) Transmission of the radio bearer control signaling for the user packet data unit.

4) Transmission of the NAS message.

Figure 6:
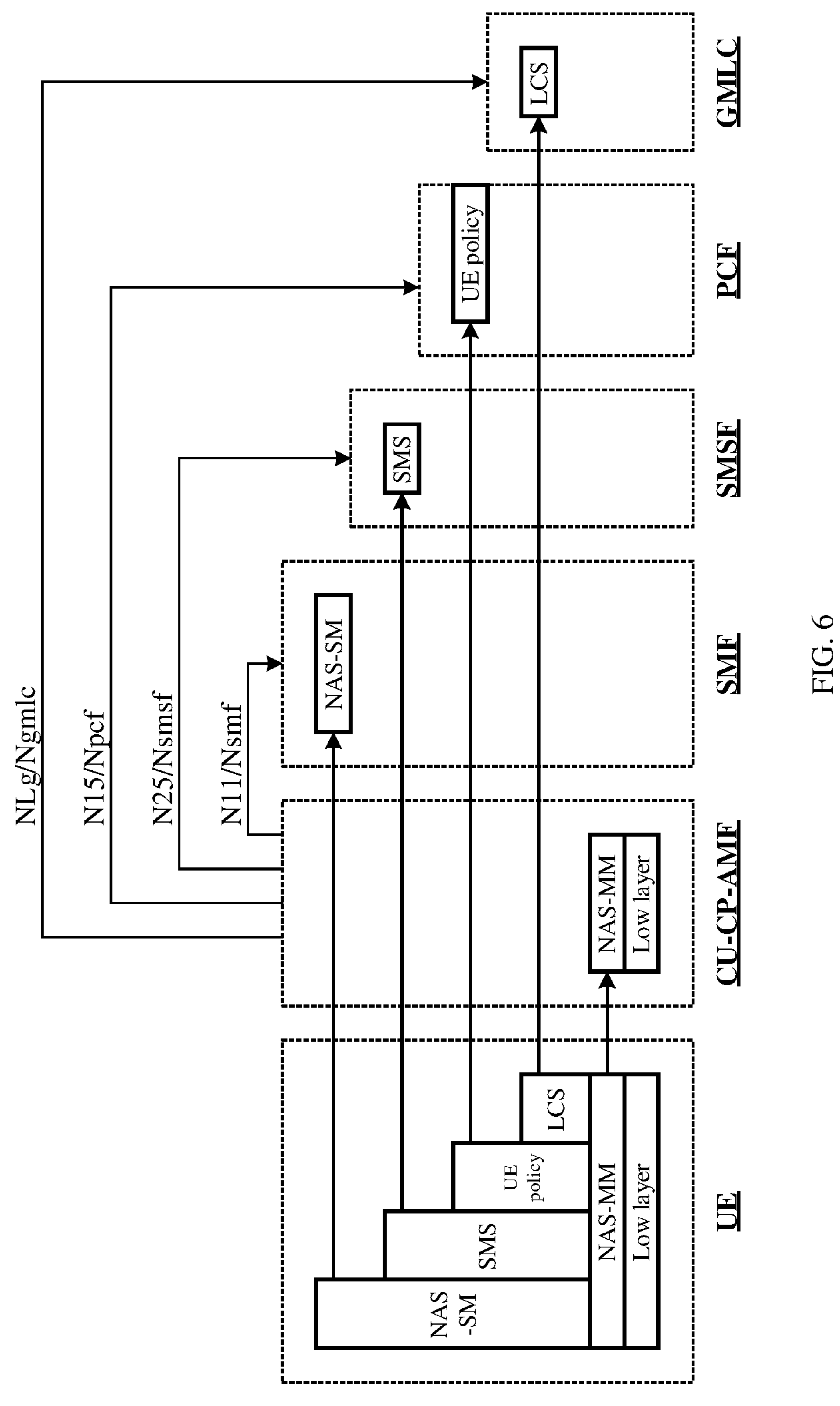
FIG. 6 is a schematic diagram showing transmission of a control plane message involved in the embodiment illustrated in FIG. 4.

Reference can be made to FIG. 6, which illustrates a schematic diagram showing transmission of a control plane message involved in the embodiment of the present disclosure. The NAS message is taken as an example. As illustrated in FIG. 6, the NAS message of the UE of the user is delivered to the CU-CP-AMF via the NR1 interface. The NAS-MM message is processed by the CU-CP-AMF. The rest of the NAS-type messages are forwarded by the CU-CP-AMF and a logic interface of another network to the SMF, the PCF, and other units.

For example, in FIG. 6, the NAS-MM message is transmitted, via the N11 interface or the Nsmf interface (i.e., the service-based SMF interface), by the CU-CP-AMF to the SMF unit for a processing, an SMS message is transmitted, via an N20 interface or the Nsmsf interface (i.e., a service-based SMSF interface), by the CU-CP-AMF to a Short Message Service Function (SMSF) unit for a processing, a UE-Policy message is transmitted, via an N15 interface or an Npcf interface (i.e., a service-based PCF interface), by the CU-CP-AMF to the PCF unit for a processing, and an LCS message is transmitted, via an NLg interface or an Ngmlc interface (i.e., a service-based GMLC interface), by the CU-CP-AMF to a Gateway Mobile Location Center (GMLC) unit for a processing.

In a possible implementation, the user plane unit cluster 402*b* includes a Distributed Unit (DU) 402*b*1 and a centralized user plane fusion unit 402*b*2. The second interface 404 includes an interface between the terminal and the DU and the centralized user plane fusion unit 402*b*2. The centralized user plane fusion unit includes a PDCP-UP function, an SDAP function, and a UPF.

In the embodiment of the present disclosure, the CU-UP includes the PDCP-UP function and the SDAP functions, which are mainly functions relevant to the packet data unit, and defined as a new unit CU-UP-UPF (i.e., the above-mentioned centralized user plane fusion unit 402*b*2) in the embodiment of the present disclosure. Main functions of the new unit CU-UP-UPF include but are not limited to dedicated processings of services relevant to the PDU and the SDU and data forwarding for the user.

In a possible implementation, the second interface is configured to perform at least one of the following transmission functions of: transmitting user data to a DU for demodulation and decoding by the DU; transmitting a PDU of a user to the DU, for the DU to transmit the PDU to a centralized user plane fusion unit; and transmitting an SDU of the user to the DU, for the DU to transmit the SDU to the centralized user plane fusion unit.

In the embodiment of the present disclosure, functions of the second interface (NR3 interface) may include: 1) transmitting the user data to the DU for demodulation and decoding; 2) transmitting PDU data of the user to the DU, for the DU to transmit the PDU data to the CU-UP-UPF for performing numbering, header compression, and other operations, to complete the routing of the QoS flow; and 3) transmitting the SDU of the user to the DU, for the DU to transmit the SDU to the CU-UP-UPF to complete the routing of the QoS flow and other operations.

In a possible implementation, the centralized user plane fusion unit 402*b*2 includes a relay centralized user plane fusion unit and an anchor centralized user plane fusion unit. Communication between the relay centralized user plane fusion unit and the anchor centralized user plane fusion unit is performed via a service-based interface. When at least one of the relay centralized user plane fusion unit and the anchor centralized user plane fusion unit is deployed on a high altitude platform, the communication between the relay centralized user plane fusion unit and the anchor centralized user plane fusion unit is transmitted transparently via an SRI interface. The DU is configured to transmit the PDU or the SDU to the relay centralized user plane fusion unit via a logic interface. The relay centralized user plane fusion unit is configured to transmit the PDU or the SDU to the anchor centralized user plane fusion unit via the service-based interface.

In a possible implementation, the DU includes at least one of a channel codec function, an MIMO function, an FFT function, or an IFFT function deployed in a network function virtualization scheme.

In the new architecture involved in the embodiment of the present disclosure, the DU may be responsible for handling tasks relevant to a processing of a wireless signal from the user or the like, and transmitting a message to the CU-UP-UPF unit for encryption, numbering, routing of a QoS flow, etc. An interface between the DU and the CU-UP-UPF may be a microservice-based interface in the architecture involved in the embodiment of the present disclosure. Therefore, a standard microservice interface may be adopted, and the protocol may be HTTP/HTTP2.0.

Figure 7:
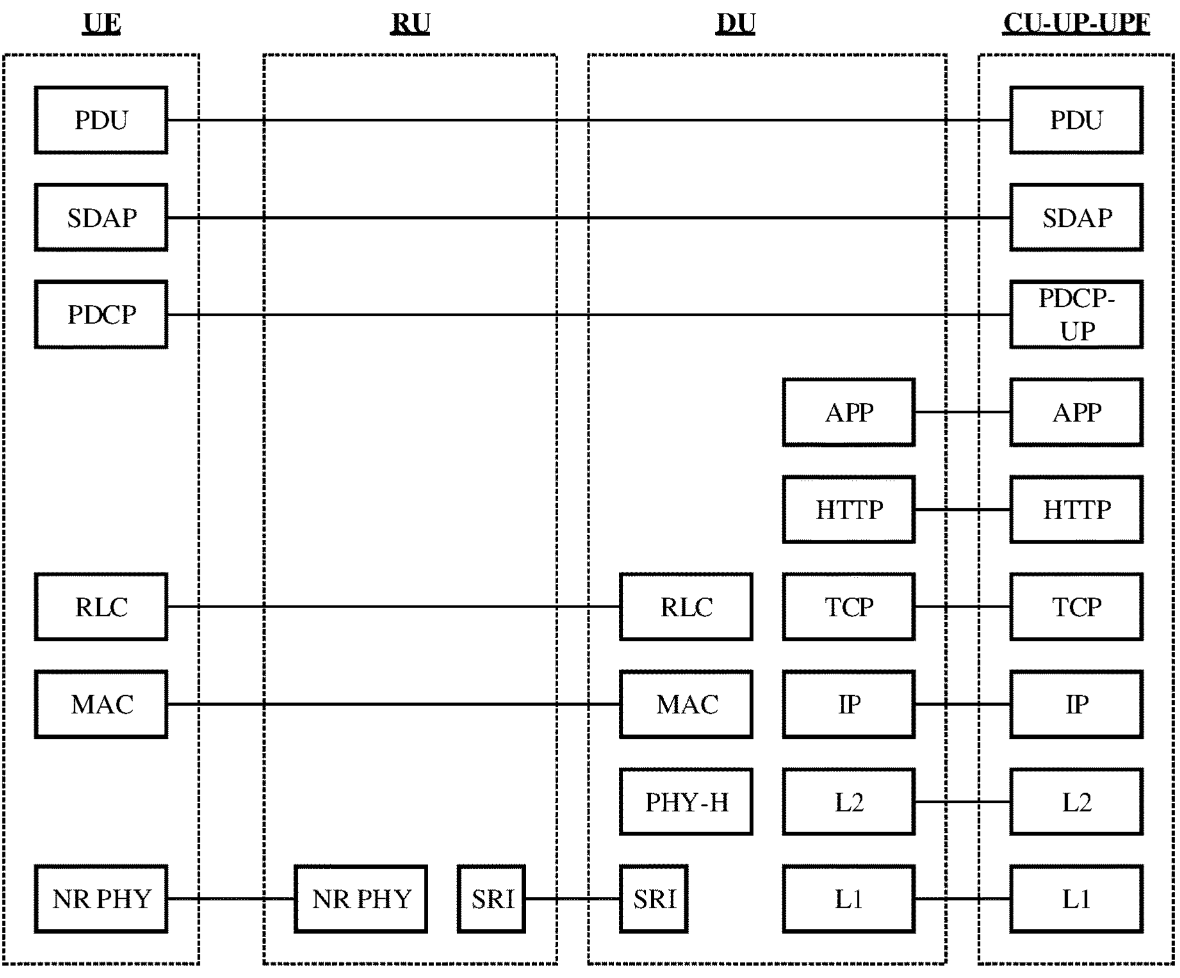
FIG. 7 is a schematic diagram showing a user-to-user-plane protocol stack involved in the embodiment illustrated in FIG. 4.

Reference can be made to FIG. 7, which illustrates a schematic diagram showing a user-to-user-plane protocol stack involved in embodiment of the present disclosure. As illustrated in FIG. 7, since the DU is located in the merged user plane, the second interface for the user to access the user plane is defined as NR3 in the embodiment of the present disclosure. The NR3 interface includes part of a protocol stack of an original NR interface: an RLC, an MAC, a PHY-H (PHY-High, a high level of the PHY), and an SRI. Since the RU and the DU may be connected via starlink, an SRI interface is further included in the protocol stack. That is, the message of the NR3 interface may be transmitted transparently via the inter-satellite interface SRI.

In FIG. 7, functions of the SRI protocol are deployed in the RU and the DU. That is, the RU and the DU may be deployed on different high altitude platforms and transmit messages via the SRI interfaces. The RLC, MAC, and PHY-H functions are deployed in the DU, while the PDU, SDAP, and PDCP-UP functions are deployed in the CU-UP-UPF.

Figure 8:
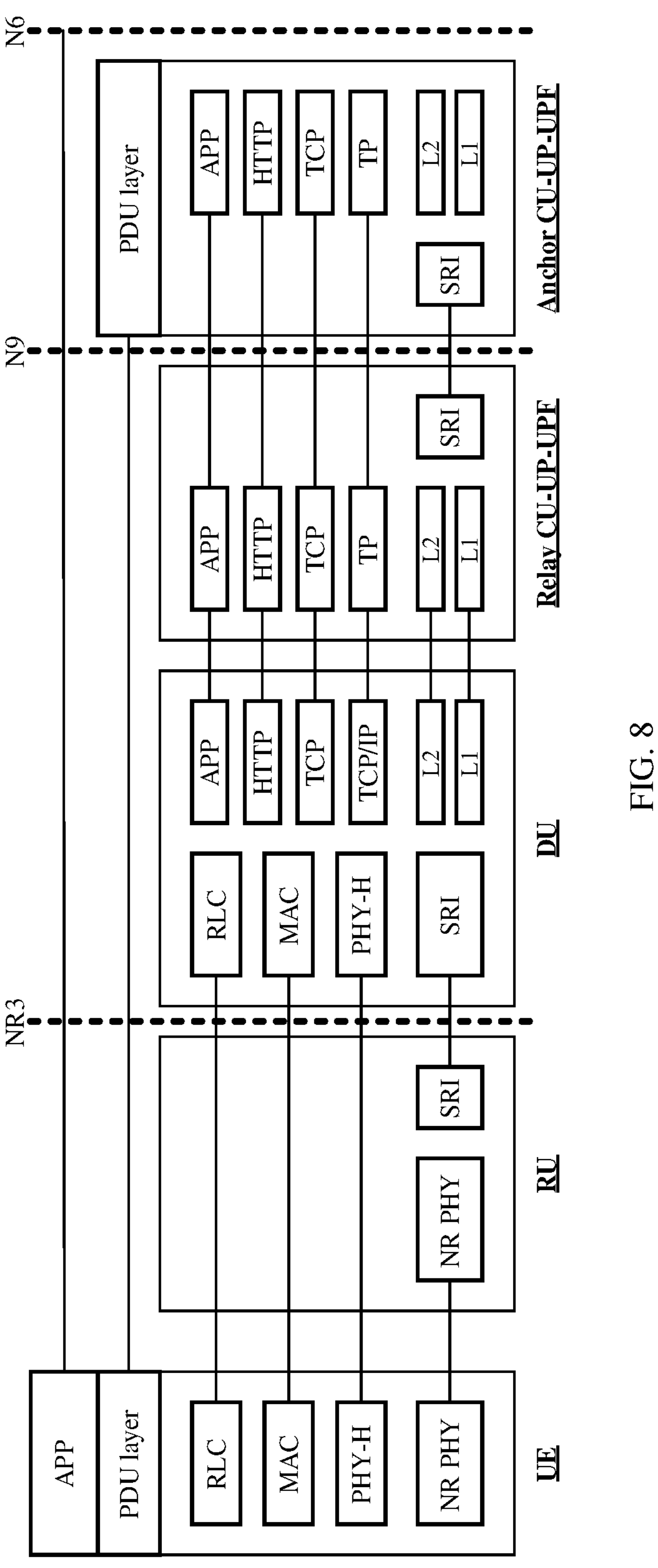
FIG. 8 is a schematic diagram showing a user plane protocol stack for a PDU session involved in the embodiment illustrated in FIG. 4.

As illustrated in FIG. 7, a PDU session message is carried directly to the DU via NR3 and transmitted by the DU to the CU-UP-UPF via an internal logic interface. Reference can be made to FIG. 8, which illustrates a schematic diagram showing a user plane protocol stack for a PDU session involved in the embodiment of the present disclosure. As illustrated in FIG. 8, a process of one PDU session is as follows.

At S81, the PDU session of the user is transmitted, via the NR3 interface, to the DU unit through the RU.

At S82, the PDU session is transmitted by the DU unit to the relay CU-UP-UPF via the internal logic interface.

At S83, the PDU session is transmitted, on the SRI via an N9 interface, transparently by the relay CU-UP-UPF to the anchor CU-UP-UPF.

At S84, data of the PDU session is transmitted by the anchor CU-UP-UPF to an external network via the N6 interface.

In summary, with the solution illustrated in the embodiment of the present disclosure, the functions of the control plane and the user plane in the access network and the core network are further aggregated to form the control plane unit cluster and the user plane unit cluster. The wireless signal forwarding is performed between the terminal and the network-side unit cluster by the radio frequency unit. Each of the control plane unit cluster and the user plane unit cluster is connected to the terminal via an interface. Therefore, the interfaces between the terminal and the user plane and between the terminal and the control plane are redefined, the network customization is achieved, the signaling interaction process is simplified, the transmission delay is reduced, and the network stability is improved.

The above-mentioned solution of the present disclosure illustrated in FIG. 4 only provides an example introduction that the control plane function and the user plane function of the CU in the access network of the 5G NR system are split and merged into the control plane and the user plane in the core network, respectively, and the DU in the access network is merged into the user plane in the core network. Optionally, the access network and the core network in the 5G NR system may also be merged in other schemes to achieve the network architecture according to the embodiment corresponding to FIG. 3.

In a possible implementation, the control plane unit cluster has a function of a CU in an NR system; or the user plane unit cluster has a function, deployed in a network function virtualization scheme, of the CU in the NR system.

That is, in another solution of merging with each of the access network and the core network according to the embodiment of the present disclosure, the CU in the 5G NR system may be directly merged with the core network control plane or with the core network user plane, and the CU and the core network form the core network of the merged network to achieve the network architecture according to the embodiment corresponding to FIG. 3 of the present disclosure.

Transmission between the terminal and the core network may be carried out via a unified interface (e.g., the NR1 interface or the NR3 interface). That is, the first interface and the second interface may be the same interface in the network architecture according to the embodiment illustrated in FIG. 3.

For example, taking a transmission process of uplink message data as an example, when the CU is directly merged with the core network control plane, the user data between the terminal and the core network may be delivered to the control plane unit cluster, and then delivered to the user plane unit cluster by the control plane unit cluster via an interface with the user plane unit cluster (which may be a service-based interface or a conventional network interface in the 5G NR system).

For example, taking the transmission process of the uplink message data as an example, when the CU is directly merged with the core network user plane, a control plane message between the terminal and the core network may be delivered to the user plane unit cluster, and then delivered to the control plane unit cluster by the user plane unit cluster via an interface with the control plane unit cluster.

In a possible implementation, the user plane unit cluster has a function, deployed in a network function virtualization scheme, of a DU in an NR system.

According to the embodiment of the present disclosure, in the solution of merging with each of the access network and the core network according to the embodiment of the present disclosure, all or a part of the functions of the DU of the access network in the 5G NR system, after being subjected to a service-based operation, form the user plane of the merged network illustrated in the embodiment of the present disclosure along with the user plane in the 5G NR system. That is, in the system illustrated in FIG. 3, instead of serving as a unit in the user plane unit cluster, the DU may be merged with another network unit (e.g., the UPF unit) in the user plane unit cluster after the service-based operation is performed on the some or all of the functions of the DU. The transmission between the terminal and the core network may be carried out via a unified interface.

In a possible implementation, the control plane unit cluster has a function, deployed in a network function virtualization scheme, of a CU in an NR system; and the user plane unit cluster has a function, deployed in a network function virtualization scheme, of a DU in the NR system.

That is, in another solution of merging with each of the access network and the core network according to the embodiment of the present disclosure, after a service-based operation is performed on each of the CU and the DU of the access network in the 5G NR system, the CU is merged with the core network control plan in the 5G NR system to form the control plane of the merged network illustrated in the embodiment of the present disclosure, and the DU is merged with the core network user plane in the 5G NR system to form the user plane of the merged network illustrated in the embodiment of the present disclosure.

For example, taking the transmission process of the uplink message data as an example, the transmission between the terminal and the core network may be performed via a unified interface. The message data is delivered by the terminal to the user plane unit cluster (e.g., to the UPF unit in the user plane unit cluster), for the user plane unit cluster to process or forward the message data. The message data is subjected to a DU-related function processing and then transmitted to the control plane unit cluster (e.g., to the AMF unit in the control plane unit cluster), for the control plane unit cluster to perform a CU-related function processing. After the CU-related function processing performed by the control plane unit cluster, a control plane message in the message data is directly processed by the control plane unit cluster, and user data in the message data is delivered back to the user plane unit cluster for the user plane unit cluster to process the user data.

In a possible implementation, the control plane unit cluster has functions, deployed in a network function virtualization scheme, of a CU and a DU in an NR system.

That is, in another solution of merging with each of the access network and the core network according to the embodiment of the present disclosure, after a service-based operation is performed on all or part of functions included in the CU and the DU of the access network in the 5G NR system, each of the CU and the DU is merged with the core network control plane in the 5G NR system to form the network architecture according to the embodiment corresponding to FIG. 3 of the present disclosure.

For example, taking the transmission process of the uplink message data as an example, the transmission between the terminal and the core network may be performed via a unified interface. The message data is delivered by the terminal to the user plane unit cluster (e.g., to the AMF unit in the control plane unit cluster), for the control plane unit cluster to process or forward the message data. After the CU-related function processing and the DU-related function processing are performed on the message data, the control plane message in the message data is directly processed by the control plane unit cluster, and the user data in the message data is delivered to the user plane unit cluster for the user plane unit cluster to process the user data.

In a possible implementation, the user plane unit cluster has functions, deployed in a network function virtualization scheme, of a CU and a DU in an NR system.

In another solution of merging with each of the access network and the core network according to the embodiment of the present disclosure, after a service-based operation is performed on all or part of functions included in the CU and the DU of the access network in the 5G NR system, each of the all or part of the functions is merged with the core network user plane in the 5G NR system to form the user plane of the merged network illustrated in the embodiment of the present disclosure.

For example, taking the transmission process of the uplink message data as an example, the transmission between the terminal and the core network may be performed via a unified interface. The message data is delivered by the terminal to the control plane unit cluster (e.g., to the UPF unit in the user plane unit cluster), for the user plane unit cluster to process or forward the message data. After the CU-related function processing and the DU-related function processing are performed on the message data, the control plane message in the message data is delivered to the control plane unit cluster for a processing, and the user data in the message data is directly processed by the user plane unit cluster.

In a possible implementation, a DU has a baseband processing function.

In the embodiment of the present disclosure, a baseband processing function of the AAU in the 5G NR system may be set in the DU.

Reference can be made to FIG. 9, which illustrates a flowchart illustrating a wireless communication method according to an embodiment of the present disclosure. The method may be performed by a network-side device in the wireless communication system in the system architecture in FIG. 3 or FIG. 4 or another system architecture. The network-side device may be the network unit in the core network cluster of the wireless communication system as described above. The method may include the following operation.

At block 901, the control plane message is transmitted with the terminal via the first interface between the control plane unit cluster and the terminal.

Reference to a transmission process of the above-mentioned control plane message can be made to the description of the embodiment relevant to the system architecture of the wireless communication system in FIG. 3 or FIG. 4 or another wireless communication system, and thus details thereof will be omitted here.

In summary, with the solution illustrated in the embodiment of the present disclosure, the functions of the control plane and the user plane in the access network and the core network are further aggregated to form the control plane unit cluster and the user plane unit cluster. The wireless signal forwarding is performed between the terminal and the network-side unit cluster by the radio frequency unit. Each of the control plane unit cluster and the user plane unit cluster is connected to the terminal via an interface. Therefore, the interfaces between the terminal and the user plane and between the terminal and the control plane are redefined, the network customization is achieved, the signaling interaction process is simplified, the transmission delay is reduced, and the network stability is improved.

Reference can be made to FIG. 10, which illustrates a flowchart illustrating a wireless communication method according to an embodiment of the present disclosure. The method may be performed by the network-side device in the wireless communication system in the system architecture in FIG. 3 or FIG. 4 or another system architecture. The method may include the following operation.

At block 1001, the user data is transmitted with the terminal via the second interface between the user plane unit cluster and the terminal.

Reference to a transmission process of the above-mentioned user data can be made to the description of the embodiment relevant to the system architecture of the wireless communication system in FIG. 3 or FIG. 4 or another wireless communication system, and thus details thereof will be omitted here.

In summary, with the solution illustrated in the embodiment of the present disclosure, the functions of the control plane and the user plane in the access network and the core network are further aggregated to form the control plane unit cluster and the user plane unit cluster. The wireless signal forwarding is performed between the terminal and the network-side unit cluster by the radio frequency unit. Each of the control plane unit cluster and the user plane unit cluster is connected to the terminal via an interface. Therefore, the interfaces between the terminal and the user plane and between the terminal and the control plane are redefined, the network customization is achieved, the signaling interaction process is simplified, the transmission delay is reduced, and the network stability is improved.

Reference can be made to FIG. 11, which illustrates a flowchart illustrating a wireless communication method according to an embodiment of the present disclosure. The method may be performed by the terminal. The method may include the following operations.

At block 1101, a control plane message is transmitted, via a first interface with a control plane unit cluster in a wireless communication system, with the control plane unit cluster.

At block 1102, user data is transmitted, via a second interface with a user plane unit cluster in the wireless communication system, with the user plane unit cluster.

The wireless communication system according to the embodiment of the present disclosure may be the wireless communication system in the system architecture in FIG. 3 or FIG. 4 or another system architecture.

Reference to transmission processes of the above-mentioned control plane message and user data can be made to the description of the embodiment relevant to the system architecture of the wireless communication system in FIG. 3 or FIG. 4 or another wireless communication system, and thus details thereof will be omitted here.

In summary, with the solution illustrated in the embodiment of the present disclosure, the functions of the control plane and the user plane in the access network and the core network are further aggregated to form the control plane unit cluster and the user plane unit cluster. The wireless signal forwarding is performed between the terminal and the network-side unit cluster by the radio frequency unit. Each of the control plane unit cluster and the user plane unit cluster is connected to the terminal via an interface. Therefore, the interfaces between the terminal and the user plane and between the terminal and the control plane are redefined, the network customization is achieved, the signaling interaction process is simplified, the transmission delay is reduced, and the network stability is improved.

Apparatus embodiments of the present disclosure are provided below and can be used to perform the method embodiments of the present disclosure. For details not disclosed in the apparatus embodiments of the present disclosure, reference can be made to the method embodiments of the present disclosure.

Reference can be made to FIG. 12, which illustrates a block diagram showing a wireless communication apparatus according to an embodiment of the present disclosure. The apparatus is applied in the network-side device in the wireless communication system in the system architecture in FIG. 3 or FIG. 4 or another system architecture, and has a function to implement the operations, performed by the wireless communication system, in the above-mentioned wireless communication method. As illustrated in FIG. 12, the apparatus may include a message transmission module 1201.

The message transmission module 1201 is configured to transmit the control plane message with the terminal via the first interface between the control plane unit cluster and the terminal.

In summary, with the solution illustrated in the embodiment of the present disclosure, the functions of the control plane and the user plane in the access network and the core network are further aggregated to form the control plane unit cluster and the user plane unit cluster. The wireless signal forwarding is performed between the terminal and the network-side unit cluster by the radio frequency unit. Each of the control plane unit cluster and the user plane unit cluster is connected to the terminal via an interface. Therefore, the interfaces between the terminal and the user plane and between the terminal and the control plane are redefined, the network customization is achieved, the signaling interaction process is simplified, the transmission delay is reduced, and the network stability is improved.

Reference can be made to FIG. 13, which illustrates a block diagram showing a wireless communication apparatus according to an embodiment of the present disclosure. The apparatus is applied in the network-side device in the wireless communication system in the system architecture in FIG. 3 or FIG. 4 or another system architecture, and has a function to implement the operations, performed by the wireless communication system, in the above-mentioned wireless communication method. As illustrated in FIG. 13, the apparatus may include a data transmission module 1301.

The data transmission module 1301 is configured to transmit the user data with the terminal via the second interface between the user plane unit cluster and the terminal.

In summary, with the solution illustrated in the embodiment of the present disclosure, the functions of the control plane and the user plane in the access network and the core network are further aggregated to form the control plane unit cluster and the user plane unit cluster. The wireless signal forwarding is performed between the terminal and the network-side unit cluster by the radio frequency unit. Each of the control plane unit cluster and the user plane unit cluster is connected to the terminal via an interface. Therefore, the interfaces between the terminal and the user plane and between the terminal and the control plane are redefined, the network customization is achieved, the signaling interaction process is simplified, the transmission delay is reduced, and the network stability is improved.

Reference can be made to FIG. 14, which illustrates a block diagram showing a wireless communication apparatus according to an embodiment of the present disclosure. The apparatus is applied in the terminal, and has a function to implement the operations, performed by the terminal, in the above-mentioned wireless communication method. As illustrated in FIG. 14, the apparatus may include a message transmission module 1401 and a data transmission module 1402.

The message transmission module 1401 is configured to transmit, via a first interface with a control plane unit cluster in a wireless communication system, a control plane message with the control plane unit cluster.

The data transmission module 1402 is configured to transmit, via a second interface with a user plane unit cluster in the wireless communication system, user data with the user plane unit cluster.

The wireless communication system according to the embodiment of the present disclosure may be the wireless communication system in the system architecture in FIG. 3 or FIG. 4 or another system architecture.

In summary, with the solution illustrated in the embodiment of the present disclosure, the functions of the control plane and the user plane in the access network and the core network are further aggregated to form the control plane unit cluster and the user plane unit cluster. The wireless signal forwarding is performed between the terminal and the network-side unit cluster by the radio frequency unit. Each of the control plane unit cluster and the user plane unit cluster is connected to the terminal via an interface. Therefore, the interfaces between the terminal and the user plane and between the terminal and the control plane are redefined, the network customization is achieved, the signaling interaction process is simplified, the transmission delay is reduced, and the network stability is improved.

It should be noted that, an implementation of functions of the apparatus according to any of the above embodiments is described only by an example division of the above-mentioned individual functional modules. In practice, the above-mentioned functions may be assigned to be accomplished by different functional modules as desired. That is, a content structure of the apparatus is divided into different functional modules to perform all or part of the above-mentioned functions.

With respect to the apparatus according to any of the above embodiments, a specific way for each module to perform an operation has been described in detail in the embodiments relevant to the method, and thus details thereof will be omitted here.

Figure 15:
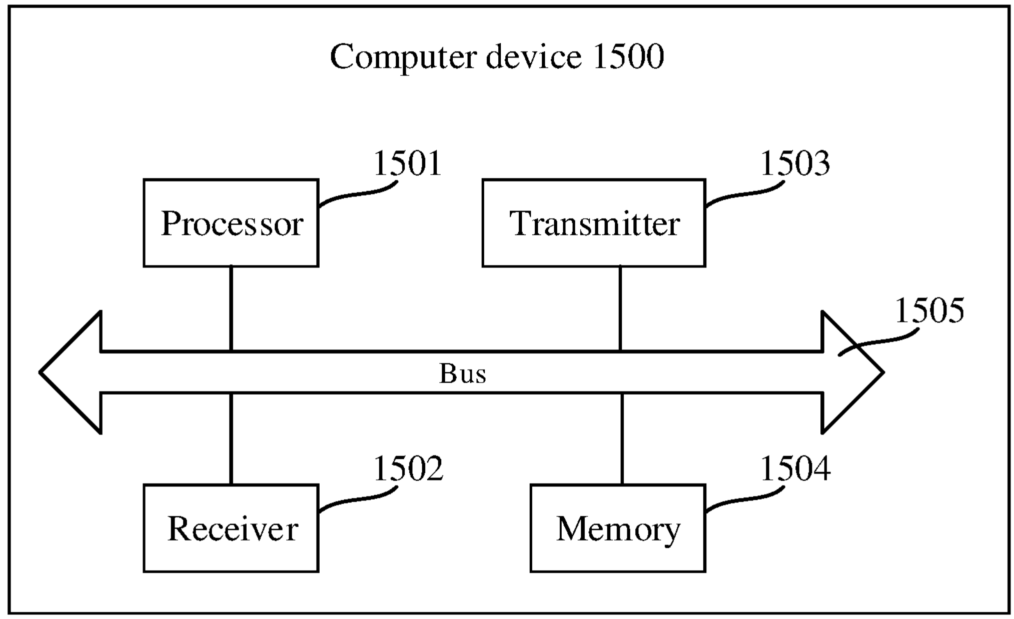
FIG. 15 is a schematic diagram showing a structure of a computer device according to an embodiment of the present disclosure.

FIG. 15 illustrates a schematic diagram showing a structure of a computer device 1500 according to an embodiment of the present disclosure. As illustrated in FIG. 15, the computer device 1500 may include a processor 1501, a receiver 1502, a transmitter 1503, a memory 1504, and a bus 1505.

The processor 1501 includes one or more processing cores. The processor 1501 executes various functional applications and information processing by running software programs and modules.

The receiver 1502 and the transmitter 1503 can be implemented as one communication component. The communication component can be a communication chip. The communication chip can also be referred to as a transceiver.

The memory 1504 is connected to the processor 1501 through the bus 1505.

The memory 1504 can be used to store a computer program. The processor 1501 is configured to execute the computer program, to implement each operation performed by the network-side device or the terminal in the wireless communication system according to any of the above method embodiments.

In addition, the memory 1504 may be implemented by any type of volatile or non-volatile storage device or a combination thereof. The volatile or non-volatile storage device includes, but is not limited to, a magnetic disk or an optical disc, an electrically erasable programmable read-only memory, an erasable programmable read-only memory, a static random access memory, a read-only memory, a magnetic memory, a flash memory, a programmable read-only memory.

In an example embodiment, the computer device includes a processor, a memory, and a transceiver (the transceiver may include a receiver configured to receive information and a transmitter configured to transmit information).

In a possible implementation, when a computer device is implemented as a network side device in a wireless communication system, the transceiver is configured to transmit the control plane message with the terminal via the first interface between the control plane unit cluster and the terminal.

In a possible implementation, when a computer device is implemented as a network side device in a wireless communication system, the transceiver is configured to transmit the user data with the terminal via the second interface between the user plane unit cluster and the terminal.

In a possible implementation, when a computer device is implemented as a terminal, the transceiver is configured to transmit, via a first interface with a control plane unit cluster in a wireless communication system, a control plane message with the control plane unit cluster; and the transceiver is further configured to transmit, via a second interface with a user plane unit cluster in the wireless communication system, user data with the user plane unit cluster. The wireless communication system according to the embodiment of the present disclosure may be the wireless communication system in the system architecture in FIG. 3 or FIG. 4 or another system architecture.

Embodiments of the present disclosure further provide a computer-readable storage medium. The storage medium stores a computer program. The computer program is loaded and executed by a processor to implement each operation in the wireless communication method illustrated in FIG. 9, FIG. 10, or FIG. 11.

The present disclosure further provides a computer program product or a computer program. The computer program product or the computer program includes computer instructions stored in a computer-readable storage medium. A processor of a computer device reads the computer instructions from the computer-readable storage medium. The processor executes the computer instructions to cause the computer device to perform each operation in the wireless communication method illustrated in FIG. 9, FIG. 10, or FIG. 11.

It is conceivable for those skilled in the art that in one or more of the above examples, functions described in the embodiments of the present disclosure may be implemented using hardware, software, firmware, or any combination thereof. When implemented using software, these functions may be stored in a computer-readable medium or transmitted as one or more instructions or codes on a computer-readable medium. The computer-readable medium includes a computer storage medium and a communication medium. The communication medium includes any medium that facilitates transmission of a computer program from one position to another. The storage medium may be any available medium that is accessible to a general purpose or specialized computer.

While the example embodiments of the present disclosure have been described above, the present disclosure is not limited to these embodiments. Any modification, equivalent substitution, improvement, etc., made within the ideas and principles of the present disclosure shall fall within the protection scope of the present disclosure.

What is claimed is:

1. A wireless communication method, applied in a terminal, the method comprising:

transmitting, via a first interface with a control plane unit cluster in a wireless communication system, a control plane message with the control plane unit cluster; and transmitting, via a second interface with a user plane unit cluster in the wireless communication system, user data with the user plane unit cluster, wherein the wireless communication system comprises a radio frequency unit and a core network cluster, and the core network cluster comprises the control plane unit cluster and the user plane unit cluster:

wherein the second interface is configured to perform at least one of the following transmission functions of: transmitting a PDU of a user to the DU, for the DU to transmit the PDU to a centralized user plane fusion unit; and transmitting a Session Data Unit (SDU) of the user to the DU, for the DU to transmit the SDU to the centralized user plane fusion unit;

wherein:

the centralized user plane fusion unit comprises a relay centralized user plane fusion unit and an anchor centralized user plane fusion unit;

communication between the relay centralized user plane fusion unit and the anchor centralized user plane fusion unit is performed via a service-based interface; and when at least one of the relay centralized user plane fusion unit and the anchor centralized user plane fusion unit is deployed on a non-terrestrial platform, the communication between the relay centralized user plane fusion unit and the anchor centralized user plane fusion unit is transmitted transparently via a Satellite Radio Interface (SRI) interface;

the DU is configured to transmit the PDU or the SDU to the relay centralized user plane fusion unit via a logic interface; and the relay centralized user plane fusion unit is configured to transmit the PDU or the SDU to the anchor centralized user plane fusion unit via the service-based interface.

2. The wireless communication method according to claim 1, wherein:

a user-side protocol stack corresponding to the first interface comprises a Non Access Stratum Session Management (NAS-SM) protocol, an NAS Mobility Management (NAS-MM) protocol, a Radio Resource Control (RRC) protocol, a Packet Data Convergence Protocol (PDCP), and a New Radio Physical layer (NR-PHY) protocol; and a network-side protocol stack corresponding to the first interface comprises an NAS-SM protocol, an NAS-MM protocol, an RRC protocol, a PDCP Control Plane (PDCP-CP), and an SRI protocol.

3. The wireless communication method according to claim 1, wherein the control plane message comprises at least one of:

an NAS message, signaling for access management, signaling for mobility management, signaling for network radio resource management, or radio bearer control signaling for a user packet data unit.

4. The wireless communication method according to claim 1, wherein:

a user-side protocol stack corresponding to the second interface comprises a Packet Data Unit (PDU) protocol, a Service Data Adaptation Protocol (SDAP), a PDCP, a Radio Link Control (RLC) protocol, a Media Access Control (MAC) protocol, and an NR-PHY protocol; and a network-side protocol stack corresponding to the second interface comprises a PDU protocol, an SDAP, a PDCP User Plane (PDCP-UP), an RLC protocol, an MAC protocol, a PHY protocol, and an SRI protocol.

5. The wireless communication method according to claim 1, wherein:

the control plane unit cluster comprises a centralized control plane fusion unit;

the first interface comprises an interface between the terminal and the centralized control plane fusion unit; and the centralized control plane fusion unit comprises an RRC function, a PDCP-CP function, and an access and mobility management function.

6. The wireless communication method according to claim 1, wherein:

the user plane unit cluster comprises a Distributed Unit (DU) and a centralized user plane fusion unit;

the second interface comprises an interface between the terminal and the DU; and the centralized user plane fusion unit comprises a PDCP-UP function, an SDAP function, and a User Plane Function (UPF).

7. The wireless communication method according to claim 1, wherein the second interface is configured to perform the following transmission function of:

transmitting user data to a DU for demodulation and decoding by the DU.

8. A non-transitory computer-readable storage medium, comprising a computer program stored thereon, wherein the computer program is executed by a processor to implement the wireless communication method according to claim 1.

9. A terminal, wherein the terminal operates in a communication system, the communication system comprising the terminal and a wireless communication system; the wireless communication system comprises a radio frequency unit and a core network cluster, and the core network cluster comprises a control plane unit cluster and a user plane unit cluster; the terminal comprising:

a processor; and a memory having a computer program stored thereon, wherein the computer program, when loaded and executed by the processor, implements a wireless communication method, comprising:

transmitting, via a first interface between the terminal and the control plane unit cluster in the wireless communication system, a control plane message with the control plane unit cluster; and transmitting, via a second interface between the terminal and the user plane unit cluster in the wireless communication system, user data with the user plane unit cluster;

wherein the second interface is configured to perform at least one of the following transmission functions of: transmitting a PDU of a user to the DU, for the DU to transmit the PDU to a centralized user plane fusion unit; and transmitting a Session Data Unit (SDU) of the user to the DU, for the DU to transmit the SDU to the centralized user plane fusion unit;

wherein:

the centralized user plane fusion unit comprises a relay centralized user plane fusion unit and an anchor centralized user plane fusion unit;

communication between the relay centralized user plane fusion unit and the anchor centralized user plane fusion unit is performed via a service-based interface; and when at least one of the relay centralized user plane fusion unit and the anchor centralized user plane fusion unit is deployed on a non-terrestrial platform, the communication between the relay centralized user plane fusion unit and the anchor centralized user plane fusion unit is transmitted transparently via a Satellite Radio Interface (SRI) interface;

the DU is configured to transmit the PDU or the SDU to the relay centralized user plane fusion unit via a logic interface; and the relay centralized user plane fusion unit is configured to transmit the PDU or the SDU to the anchor centralized user plane fusion unit via the service-based interface.

10. The terminal according to claim 9, wherein:

a user-side protocol stack corresponding to the first interface comprises a Non Access Stratum Session Management (NAS-SM) protocol, an NAS Mobility Management (NAS-MM) protocol, a Radio Resource Control (RRC) protocol, a Packet Data Convergence Protocol (PDCP), and a New Radio Physical layer (NR-PHY) protocol; and a network-side protocol stack corresponding to the first interface comprises an NAS-SM protocol, an NAS-MM protocol, an RRC protocol, a PDCP Control Plane (PDCP-CP), and an SRI protocol.

11. The terminal according to claim 9, wherein the control plane message comprises at least one of:

an NAS message, signaling for access management, signaling for mobility management, signaling for network radio resource management, or radio bearer control signaling for a user packet data unit.

12. The terminal according to claim 9, wherein:

a user-side protocol stack corresponding to the second interface comprises a Packet Data Unit (PDU) protocol, a Service Data Adaptation Protocol (SDAP), a PDCP, a Radio Link Control (RLC) protocol, a Media Access Control (MAC) protocol, and an NR-PHY protocol; and a network-side protocol stack corresponding to the second interface comprises a PDU protocol, an SDAP, a PDCP User Plane (PDCP-UP), an RLC protocol, an MAC protocol, a PHY protocol, and an SRI protocol.

13. A network side device in a wireless communication system, wherein the wireless communication system comprises a radio frequency unit and a core network cluster, and the core network cluster comprises a control plane unit cluster and a user plane unit cluster; wherein the network side device is a network unit in the core network cluster of the wireless communication system; the network side device comprising:

a processor; and a memory having a computer program stored thereon, wherein the computer program, when loaded and executed by the processor, implements a wireless communication method, comprising:

transmitting, via a first interface between the control plane unit cluster and a terminal, a control plane message with the terminal; and transmitting, via a second interface between the user plane unit cluster and the terminal, user data with the terminal;

wherein the second interface is configured to perform at least one of the following transmission functions of: transmitting a PDU of a user to the DU, for the DU to transmit the PDU to a centralized user plane fusion unit; and transmitting a Session Data Unit (SDU) of the user to the DU, for the DU to transmit the SDU to the centralized user plane fusion unit:

wherein:

the centralized user plane fusion unit comprises a relay centralized user plane fusion unit and an anchor centralized user plane fusion unit;

communication between the relay centralized user plane fusion unit and the anchor centralized user plane fusion unit is performed via a service-based interface; and when at least one of the relay centralized user plane fusion unit and the anchor centralized user plane fusion unit is deployed on a non-terrestrial platform, the communication between the relay centralized user plane fusion unit and the anchor centralized user plane fusion unit is transmitted transparently via a Satellite Radio Interface (SRI) interface;

the DU is configured to transmit the PDU or the SDU to the relay centralized user plane fusion unit via a logic interface; and the relay centralized user plane fusion unit is configured to transmit the PDU or the SDU to the anchor centralized user plane fusion unit via the service-based interface.

14. The network side device according to claim 13, wherein:

a user-side protocol stack corresponding to the first interface comprises a Non Access Stratum Session Management (NAS-SM) protocol, an NAS Mobility Management (NAS-MM) protocol, a Radio Resource Control (RRC) protocol, a Packet Data Convergence Protocol (PDCP), and a New Radio Physical layer (NR-PHY) protocol; and a network-side protocol stack corresponding to the first interface comprises an NAS-SM protocol, an NAS-MM protocol, an RRC protocol, a PDCP Control Plane (PDCP-CP), and an SRI protocol.

15. The network side device according to claim 13, wherein the control plane message comprises at least one of:

an NAS message, signaling for access management, signaling for mobility management, signaling for network radio resource management, or radio bearer control signaling for a user packet data unit.

16. The network side device according to claim 13, wherein:

a user-side protocol stack corresponding to the second interface comprises a Packet Data Unit (PDU) protocol, a Service Data Adaptation Protocol (SDAP), a PDCP, a Radio Link Control (RLC) protocol, a Media Access Control (MAC) protocol, and an NR-PHY protocol; and a network-side protocol stack corresponding to the second interface comprises a PDU protocol, an SDAP, a PDCP User Plane (PDCP-UP), an RLC protocol, an MAC protocol, a PHY protocol, and an SRI protocol.

17. The network side device according to claim 13, wherein:

the control plane unit cluster comprises a centralized control plane fusion unit;

the first interface comprises an interface between the terminal and the centralized control plane fusion unit; and the centralized control plane fusion unit comprises an RRC function, a PDCP-CP function, and an access and mobility management function.

18. The network side device according to claim 13, wherein:

the user plane unit cluster comprises a Distributed Unit (DU) and a centralized user plane fusion unit;

the second interface comprises an interface between the terminal and the DU; and the centralized user plane fusion unit comprises a PDCP-UP function, an SDAP function, and a User Plane Function (UPF).

19. The network side device according to claim 13, wherein the second interface is configured to perform the following transmission function of:

transmitting user data to a DU for demodulation and decoding by the DU.

* * * * *